July 26, 1960  E. E. HESTON  2,946,089
EXTRUDER WITH JOINTED FEED SCREW
Filed Nov. 27, 1957
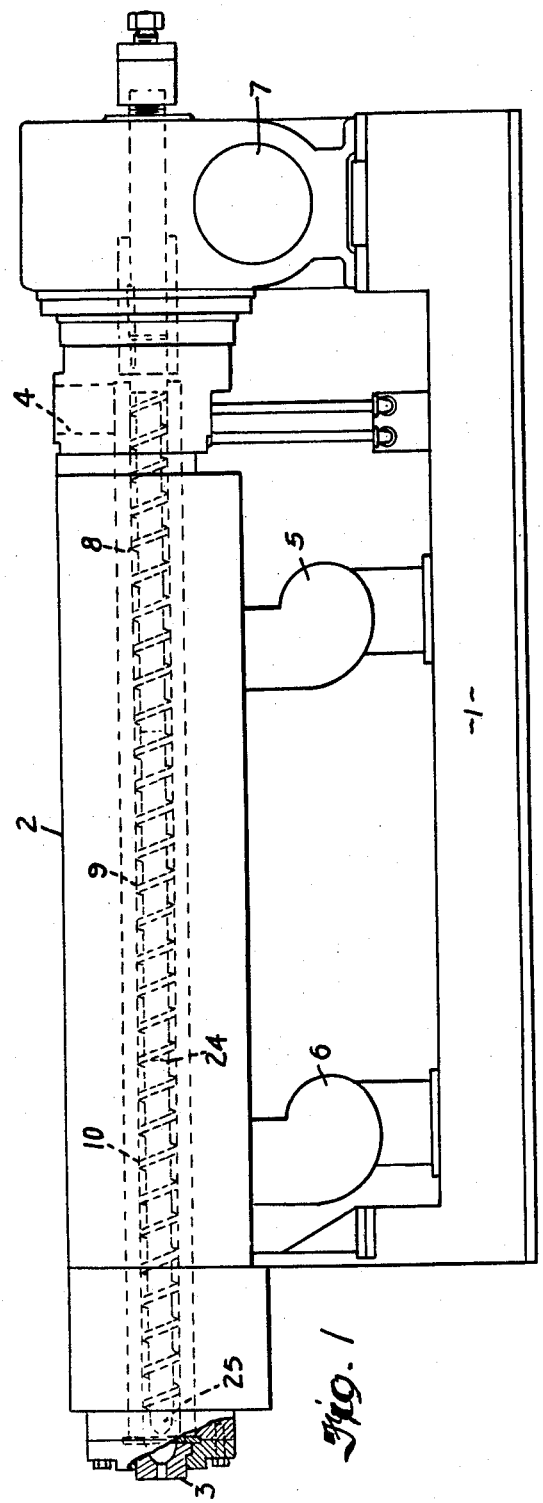
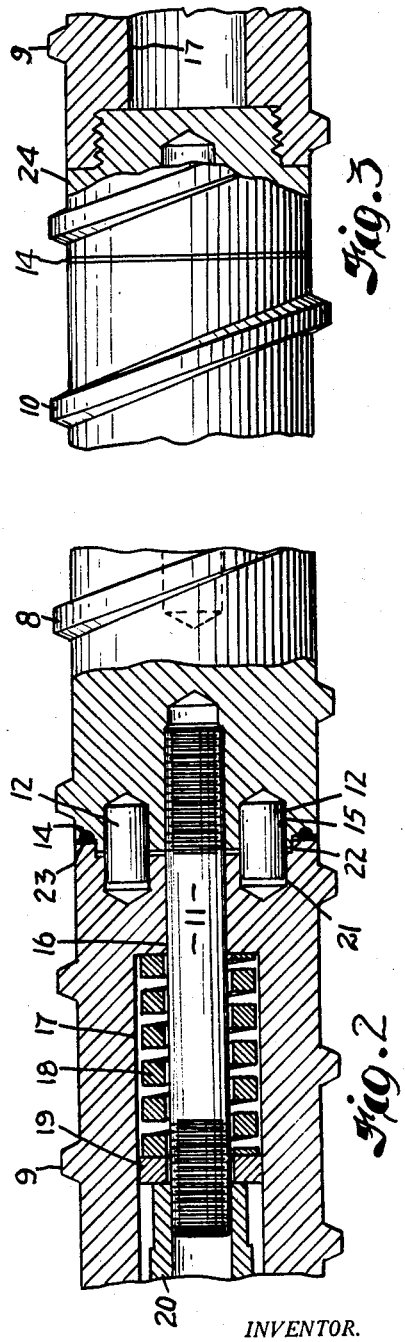
INVENTOR.
EUGENE E. HESTON
BY
Oberlin & Limbach
ATTORNEYS.

United States Patent Office 2,946,089
Patented July 26, 1960

2,946,089

EXTRUDER WITH JOINTED FEED SCREW

Eugene E. Heston, Akron, Ohio, assignor to National Rubber Machinery Company, Akron, Ohio, a corporation of Ohio Filed Nov. 27, 1957, Ser. No. 699,283

4 Claims. (Cl. 18—12)

The present invention relates generally as indicated to an extruder having a jointed feed screw, and more particularly, to an extruder which is of such great length in relation to its diameter as to create problems in holding the passage therethrough straight when the extruder is in operation.

There is a current trend in the extruding industry to make extruders of ever increasing length for effecting working of the material for a greater length of time, for building up higher back pressures on the material, for better mixing and smearing action on the material and for more thorough and uniform heating of the material. Also contributing to the increasing length of present day extruders is the provision of de-volatilizing vents along the length of the barrel, the provision of mixing zones between the ends of the barrel whereat the material is subjected to kneading-smearing action between generally axial or long lead ribs in the barrel and on the feed screw, the provision of an elongated torpedo on the feed screw along which the material flows as a relatively thin tubular stream, the provision of a strainer or breaker plate assembly adjacent the die end of the extruder, etc. Until recently the length to diameter ratio of a feed screw for an extruder was usually no longer than about 20:1, but ratios of 24:1 are being encountered frequently and, in some instances, the ratio may be 30:1 or greater.

The making of such slender feed screws has proved to be a costly proposition since special techniques are required to machine the long length of bar stock so that it will be straight. Moreover, whether the barrel be unitary or be composed of adjacent sections it is difficult and costly to align the same so as to receive the feed screw without binding. Even when the barrel and feed screw are initially straight, the varying temperatures and pressures encountered in operation of the extruder may cause misalignment or the alternate heating and cooling may cause such misalignment.

Accordingly, it is a primary object of this invention to provide an extruder having a feed screw made up of successive relatively short sections that are easy to machine in desired straight form.

It is another object of this invention to provide an extruder that has a jointed feed screw therein, the joints between adjoining sections of the feed screw being universal in nature so as to be self-aligning while yet providing for transmission of necessary torque from one section to the next.

It is another object of this invention to provide a unique form of jointed feed screw for an extruder that is characterized by its strong torque transmitting connections between adjoining sections and its capability to adjust itself to accommodate misalignment.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

Fig. 1 is a side elevation view, partly in cross-section, showing an extruder having a jointed feed screw according to the present invention;

Fig. 2 is a fragmentary cross-section view showing the joint between adjacent sections of the feed screw; and, Fig. 3 shows in fragmentary section another joint modified to provide access to the first-mentioned joint.

Referring now more particularly to the drawings, the extruder herein comprises a base 1 on which is mounted the cylinder or barrel assembly 2 which is provided at one end with an extrusion die 3 and adjacent the other end with a feed opening 4 for material to be extruded. Blowers 5 and 6 are provided at longitudinally spaced intervals along the barrel assembly for circulating temperature modifying medium around the cylinder proper.

The reference numeral 7 denotes the drive motor on the base 1 which, in well-known manner, is effective to rotate a feed screw extending longitudinally through the barrel assembly 2. In this particular case, because of the great length of the cylinder assembly 2 with reference to its diameter, the feed screw is made up of three sections 8, 9 and 10 which are joined together for limited aligning movement at the cylinder assembly 2.

Referring now to the joint, as best shown in Fig. 2, between the adjacent sections 8 and 9 of the feed screw there is threaded into the end of the section 8 a stud 11. Said section 8 has a plurality of circularly arranged pins 12 projecting axially therefrom. In the present case there are six such pins 12 but obviously a fewer number or a greater number of pins may be provided, as desired or necessary. The end face of said section 8 surrounding the pins 12 is formed with an annular groove in which is disposed an O-ring 14 of silicone rubber or like resiliently deformable material. Said section 8 is also provided with an axially extending lip 15 that has an externally rounded corner.

The feed screw section 9 is formed with a bore 16 which has a slight clearance around the stud 11 and is formed with a counterbore 17 that provides an abutment shoulder for a compression spring 18. Disposed around the stud 11 adjacent the other end of the spring 18 is a washer 19, and threaded onto said stud is a nut 20.

The end of said section 9 is formed with sockets 21 in which the ends of the pins 12 are a slip fit but providing a slight clearance for parallel and angular misalignment of the section 9 with respect to the section 8. The end of the section 9 is also provided with an annular end face 23 which is adapted to engage and to form a fluid-tight seal against the O-ring 14. The end of section 9 is also formed with a recess 22 in which the lip 15 has a slip fit with a slight clearance for relative tilting of the sections 8 and 9.

In the case of the joint between sections 9 and 10 there is provided an adapter 24 that is screwed into section 9 but is removable to provide access to the nut 20 from the counterbore 17. The adapter 24 carries a stud 11, pins 12, an O-ring 14 and is formed with a lip 15 as described in connection with Fig. 2. Similarly, the feed screw section 10 is formed with a bore 16, a counterbore 17, sockets 21 for the pins 12, a socket 22 for the lip 15 and is provided with a spring 18, a washer 19 and a nut 20 arranged as shown in Fig. 2.

The end of the section 10 which is adjacent to the die 3 may be provided with a removable plug 25 which closes that end of the feed screw assembly.

The feed screw section 8 may be hollow, as shown, for circulation of temperature modifying medium therethrough.

Other modes of applying the principle of the invention may be employed, change being made as regards the details described, provided the features stated in any of the following claims, or the equivalent of such, be employed.

I therefore particularly point out and distinctly claim as my invention:

1. A jointed feed screw for plastic and like extruders comprising adjacent feed screw sections respectively provided with a circular series of axially extending pins on a diameter less than that of the root diameters of said sections and with a corresponding series of sockets in which said pins are fitted to permit limited aligning movement of said sections with respect to each other and to constitute drive means for transmission of torque from one section to the other, spring means within the root diameters of the respective sections yieldably drawing said sections axially together, and a resiliently deformable packing ring forming a sealed joint between the juxtaposed ends of said sections in an area surrounding said pins and sockets said spring means retaining sealing pressure on said packing ring while permitting relative aligning movement of said feed screw sections.

2. A jointed feed screw for plastic and like extruders comprising a first feed screw section, a central stud projecting axially from an end of said first section, a circular series of pins also projecting axially from said first section, a second feed screw section provided with a central opening through which said stud extends and with a circular series of recesses into which said pins extend for limited aligning movement of said sections, said second section being formed with a counterbore surrounding said stud, a coil spring in such counterbore surrounding said stud, an adjusting nut threaded onto said stud to adjustably compress said spring and thus urge said sections axially together, and a packing ring disposed between said sections to seal the areas about said pins and recesses.

3. The feed screw of claim 2 wherein said sections are formed with a complementary interfitting circular lip and recess inside said packing ring and surrounding said pins and recesses.

4. A feed screw for plastic and the like extruder comprising adjacent sections, a driving connection between said sections radially inward of the root diameter of the screw and resilient sealing means between equal root diameter juxtaposed end portions of said sections radially outward of said connection for isolating the driving connection from the material being conveyed by said screw, said driving connection being arranged to permit axial aligning movement of said sections while said sealing means accommodates the relative aligning movement between said adjacent sections, and spring means within the root diameters of said sections yieldably drawing said sections axially together to exert sealing pressure on said sealing means.

References Cited in the file of this patent

UNITED STATES PATENTS

| | | |
|---|---|---|
| 111,776 | Potter | Feb. 14, 1871 |
| 2,492,915 | Carlson | Dec. 27, 1949 |
| 2,630,341 | Downey | Mar. 3, 1953 |
| 2,636,760 | Gleasman | Apr. 28, 1953 |
| 2,662,243 | Schnuck et al. | Dec. 15, 1953 |

FOREIGN PATENTS

| | | |
|---|---|---|
| 883,421 | Germany | July 16, 1953 |